United States Patent [19]

Saxon

[11] Patent Number: 4,502,633

[45] Date of Patent: Mar. 5, 1985

[54] VARIABLE CAPACITY GASIFICATION BURNER

[75] Inventor: Daniel I. Saxon, Kingsport, Tenn.

[73] Assignee: Eastman Kodak Company, Rochester, N.Y.

[21] Appl. No.: 439,479

[22] Filed: Nov. 5, 1982

[51] Int. Cl.³ ............................................... C10J 3/48
[52] U.S. Cl. ................................ 239/132.3; 48/86 R; 48/DIG. 7; 239/412; 239/417; 239/422; 239/424
[58] Field of Search ............ 48/73, 77, 86 R, DIG. 7, 48/197 R; 239/132.3, 412, 417, 417.5, 420, 422, 424

[56] References Cited

U.S. PATENT DOCUMENTS

| | | | |
|---|---|---|---|
| 3,074,231 | 1/1963 | Klein | 237/417 X |
| 3,241,825 | 3/1966 | Jilek et al. | 239/417 |
| 3,874,592 | 4/1975 | Buschmann et al. | 239/132.3 |
| 4,443,228 | 4/1984 | Schlinger | 239/132.3 X |

Primary Examiner—Andres Kashnikow
Attorney, Agent, or Firm—Malcolm G. Dunn; Daniel B. Reece, III

[57] ABSTRACT

A variable capacity burner that may be used in gasification processes, the burner being adjustable when operating in its intended operating environment to operate at two different flow capacities, with the adjustable parts being dynamically sealed within a statically sealed structural arrangement to prevent dangerous blow-outs of the reactants to the atmosphere.

8 Claims, 2 Drawing Figures

VARIABLE CAPACITY GASIFICATION BURNER

DESCRIPTION

1. Technical Field

The present invention is directed to a variable capacity burner, such as a burner as used for gasification from reactants such as some form of a hydrocarbon, and oxygen, where the burner may be adjusted while in operation to regulate the flow velocity of the reactants.

2. Background Art

In a gasification process, it is necessary to have a redundancy of gasifiers, each operating at reduced capacity so that should one of them (depending upon whether "redundancy" means two or more gasifiers, but typically it would be two) go out of service for whatever reason, the remaining one may be operated at a greater capacity to make up for the loss of the other. Therefore, it is highly desirable to have gasification burners that can be operated at two different flow velocities, with the adjustment being made during the course of operation. If the redundancy involves two complete units, then the burner of each will be operated at 50% capacity, and if one unit has to be shut down for whatever reason, the other burner may be immediately adjusted to perform at 100% capacity. Velocity is important in order to get proper atomization and thus good combustion and hence proper reaction. For instance, efficient mixing of a hydrocarbon, such as coal slurry, and oxygen will avoid formation of unconverted particulate carbon, otherwise called "soot", and substantial reduction of carbon dioxide. Poor mixing will result in excessive smoke and loss of efficiency.

To meet these desired conditions, therefore, the burner must be capable of being optimumly adjusted so that it may perform efficiently at either 50% or 100% capacity. The temperatures of reaction are quite high, so there is no time to cool down a gasification burner and remove it so as to make an adjustment of its velocity, as is true of some of the prior art. The adjustment must occur immediately upon discovering the necessity to shut one of the units down. For instance, in a proposed gasification process in which the burner of the present invention is to be used, over a single 24-hour operation period a burner operating at 100% capacity will process in coal slurry the equivalent of about nine (9) railroad cars of coal, considering each railroad car to have a capacity for carrying about 90.72 metric tons (100 short tons) of coal. Obviously, therefore, any undue delay in making the adjustment represents the loss of a significant amount of coal slurry, not even considering how much oxygen would also be lost, oxygen itself being a very significant item of cost.

In order to make an adjustment of a gasification burner while in its intended operating environment, some kind of packing gland or elastomeric seals must be used. Such seals are known as "dynamic seals" because there is relative motion between the seal and whatever the seals seal against. The problem with dynamic seals, however, is that they tend to leak more readily than static seals. With "static seals", there is no intended relative motion between the parts once they are secured or bolted together.

In a gasification process, if the seal is between the medium being sealed and the outside atmosphere, then a leak would be very serious because the medium would be spewed out into the atmosphere. This would not only result in a loss of product, but if the medium were oxygen, a fire would result including the burning of any adjacent metals with which the oxygen would come into contact. If the medium were a hydrocarbon it could cause either a fire or severe smoking in the atmosphere and thus pollution of the surrounding environment. In the invention disclosed herein it will be seen that the dynamic seals involved are enclosed within the confines of a statically sealed area in such manner that a leak past the dynamic seals would have no serious consequences.

In U.S. Pat. No. 3,758,037, for instance, there is a disclosure of a burner and a process for the manufacture of gas mixtures rich in hydrogen and carbon monoxide, such as synthesis gas, fuel gas, and reducing gas, by the partial oxidation of a hydrocarbon with an oxygen-rich gas such as air, oxygen-enriched air or substantially pure oxygen and, optionally, with steam or another temperature modulator.

The product gas mixture is produced in the reaction zone of a noncatalytic, refractory-lined, freeflow partial oxidation generator (see U.S. Pat. No. 2,809,104 for a description of a partial oxidation generator). The patent discloses a burner, which comprises an inner assembly and a concentric coaxial conduit disposed longitudinally about the inner assembly so as to provide a free annular passage therebetween. The inner assembly comprises a central conduit of circular cross-section and a bundle of comparatively smaller diameter open-ended tubes. The bundle of tubes extends downstream from the exit end of the central conduit. The open-ended tubes are parallel to the burner axis and to each other but do not touch each other, and are shown to extend close to the burner face; however, as shown in other embodiments they may be foreshortened so that they terminate slightly upstream of the burner face. The central conduit is open at its inlet end and closed at its exit end, and the bundle of smaller-diametered tubes is sealed into the exit end of the central conduit and is in communication therewith. In this manner, the patent discloses that a reactant stream may be freely passed through the inner assembly by being passed first through the central conduit and then through the bundle of the smaller-diametered tubes. The upstream portion of the concentric coaxial conduit is open and forms an annular passage with the central conduit through which a reactant stream may be freely passed. The downstream end of the coaxial conduit is disposed about the bundle of tubes and has a converging nozzle for the purpose of facilitating intermixing the streams and to force a flat velocity profile across the interstitial stream, which is the stream that flows between the central conduit and the coaxial conduit and thus around and between the bundle of the smaller-diametered tubes. A table is given to show typical combinations of reactant streams which may be introduced into the reaction zone of the synthesis gas generator by the disclosed burner. This table is reproduced as follows:

TABLE I

| Stream Passing Through Inner Assembly | Stream Passing Through Concentric Conduit |
| --- | --- |
| oxygen-rich gas | liquid hydrocarbon fuel - H₂O |
| oxygen-rich gas | gaseous hydrocarbon fuel |
| liquid hydrocarbon fuel - H₂O | oxygen righ gas |
| gaseous hydrocarbon fuel | oxygen-rich gas |
| liquid hydrocarbon fuel | oxygen-rich gas - H₂O |
| liquid hydrocarbon fuel - H₂O | oxygen-rich gas - H₂O |

The patent explains that the term hydrocarbon includes by definition pumpable slurries of solid carbonaceous fuels such as coal, etc.

U.S. Pat. No. 3,758,037 also discloses another embodiment in FIG. 5 where there are two coaxial concentric conduits, with one being called an intermediate conduit and the other being called an outermost conduit, both of which being disposed around the inner assembly containing the bundle of smaller diametered tubes. As a result of this construction there is an inner annulus passage next to the inner assembly and an outer annulus passage. The outer annulus passage provides a relatively nonreactive stream separating the surrounding product synthesis gas from the feed stream in the interstitial area. This separation is said to be particularly desirable when the interstitial fluid is the oxidant, which can react rapidly with synthesis gas close to the burner tip and cause burner tip deterioration. This outer annulus passage thus provides greater burner durability rather than to promote higher combustion effeciency.

The burner disclosed in the above-described U.S. Pat. No. 3,758,037 thus may provide for the flow of two separate reactants or in one of the alternate embodiments two separate reactants and a temperature-moderating gas in the outer annulus. There is no disclosure of any adjustable burner in which the flow velocity may be regulated. In the burner of my invention, I provide for the flow of three separate reactants, two of which may be the same reactant, and I may also regulate the flow velocity of one of the reactants by causing a constriction or an opening up of one of the channels through which a reactant flows while the burner is operating. The process for the burner of the patent described above is claimed in U.S. Pat. No. 3,945,942.

U.S. Pat. No. 3,874,592 discloses another burner construction wherein the burner has a cylindrical conduit and a concentric coaxial outer conduit radially disposed about the outside of the cylindrical conduit along its length. At the downstream end of the burner the outside surface of the cylindrical conduit and the inside surface of the concentric coaxial outer conduit form therebetween a single concentric converging annular discharge passage. The central or cylindrical conduit has a downstream nozzle provided with an inner unobstructed cylindrically-shaped discharge orifice and a converging frusto-conically-shaped outside surface. The concentric coaxial outer conduit has a downstream concentric converging frusto-conically-shaped outer nozzle. The outer nozzle is provided with an annular cooling chamber at the downstream tip of the burner, the annular cooling chamber being designed in the form of a tubular ring of approximately hemispherical cross-section and being welded to the side of the converging frusto-conically-shaped tapered outside surface of the outer nozzle. The burner is also provided with cooling coils which encircle the burner near the region of the downstream tip of the nozzle. There is no disclosure of one of the conduits being adjustable with respect to the other conduit to regulate the flow velocity of one of the reactants.

U.S. Pat. No. 4,216,908 discloses still another burner construction for liquid fuel. The burner has therewithin a liquid fuel supply conduit, the conduit has a truncated conical tip with a spraying nozzle on the trapezoidal plane. A swirler for whirling liquid fuel is positioned within the inner part of the truncated conical tip portion. The liquid fuel supply conduit is provided on its outer periphery with an assembly for forming auxiliary combustion gas supplying passages. The burner is constructed so as to be capable of adjusting the space of clearance of the annular conical flow path for supplying auxiliary combustion gas. The liquid supply conduit and the assembly for forming auxiliary combustion gas supplying passages are each threaded so that one of them may be adjusted relative to the other, and then they are securely fixed at their relative locations by a cap nut. Thus, when adjustment is made on one burner, it remains fixed at that adjustment, and no adjustment can be made during the operation of the burner as is possible with the burner of the hereindisclosed burner of this invention.

U.S. Pat. No. 3,620,455 discloses a "gas injection lance" having a plurality of concentric pipes, with the centrally-positioned and intermediately-positioned pipes of three concentrically-positioned pipes being axially movable independently of each other and of the outer pipe. The purpose of such independent movement is to allow for changes in temperature so that there is no distortion caused in the various portions of the burner. The movable parts are sealed by O-rings. In order to have a 100 percent safety factor against leakage or passage of coolant gas or water and oxygen the patentee provides for a double piston effect involving a bushing member, a piston sleeve and a bushing sleeve in combination with the use of sealing O-ring members. Any leaks will occur into the atmosphere rather than oxygen gas or fuel gas into the water coolant or the water coolant into the oxygen gas or into the fuel gas because of the sealing arrangement disclosed. This differs from the present invention where it is imperative that there be no leaks of oxygen to the atmosphere at all, otherwise there would be a dangerous blow-out occurrence with serious consequences. There is no disclosure of any adjustments being made during the operation of the burner as is possible with the burner of the present invention.

DISCLOSURE OF THE INVENTION

In accordance with the present invention, I provide a variable capacity gasification burner such as may be used in a coal gasification process or the like. The burner comprises an outer elongated tubular shell having upstream and downstream ends and being statically sealed against the atmosphere outside the shell when the downstream end is positioned in the intended operating environment. A plurality of elongated concentric tubular members is positioned concentrically within the outer tubular shell and is spaced therefrom and from each other to define along and therebetween and with the outer elongated tubular shell channels along which reactants may flow. The elongated concentric tubular members also have upstream and downstream ends.

The outer elongated tubular shell and the elongated concentric tubular members define at their respective upstream ends openings through which the reactants may be introduced, and at their respective downstream ends nozzle openings from which reactants flow and come together for reaction. One of the elongated tubular members is adapted when the burner is in the intended operating environment to be slidably moved in an axial direction parallel to the axis of the concentric tubular members and the wall of its nozzle opening thus being adapted to be moved toward and away from the wall of one of the outer tubular shells and tubular members to constrict and open up the nozzle opening to the channel therebetween to regulate the flow velocity of the reactant therefrom.

The outer tubular shell defines at its upstream end one wall of an annular chamber concentric with the concentric tubular members and the outer tubular shell. Another of the elongated tubular members also defines at its upstream end the second wall of the annular chamber spaced opposite the aforementioned one wall of the annular chamber.

The slidably movable elongated tubular member at its upstream end also defines an annular piston adapted to be slidably moved axially within the annular chamber.

The outer tubular shell also defines first and second conduit openings through which one of the reactants may be introduced to the portion of the annular chamber on one side of the annular piston and one of the reactants or an inert gas may be introduced to a portion of the annular chamber on the other side of the annular piston to move the annular piston in one direction or the other depending upon the difference in pressure between the two sides of the annular piston.

The annular piston is provided with an arrangement for limiting the extent of axial movement of the annular piston in either direction and also has an arrangement for providing a dynamic seal between the annular piston and the walls of the annular chamber to prevent flow of the one reactant from the portion of the annular chamber on one side of the annular piston to the portion of the annular chamber on the other side of the annular piston.

What is most significant about the structure described thus far is that it has a movable portion that is dynamically sealed within a statically-sealed structure. This means that should a leak of reactant occur from the dynamically-sealed area, it will be prevented from undesirably escaping to the atmosphere by the statically-sealed outer tubular shell. Moreover, as will later be seen, a leak past the dynamic seal into the statically-sealed outer tubular shell will be conveyed away harmlessly from the burner to be either reacted or returned to the source of the reactant that is leaking.

In the variable capacity gasification burner, the aforementioned plurality of concentric tubular members may comprise a fixed center tubular member adapted to receive through its upstream end opening one of the reactants, oxygen, and defining at its downstream end a cross-section that converges from a larger diameter tubular portion to a smaller diameter tubular portion. The burner may further comprise a fixed intermediate tubular member surrounding the center tubular member and adapted to receive through its upstream end opening another of the reactants, coal slurry, and defining at its downstream end a converging frusto-conically-shaped nozzle cross-section. The burner may still further comprise a slidably movable outer tubular member surrounding the intermediate tubular member and adapted to receive through its upstream end one of the reactants, oxygen, and defining at its downstream end a frusto-conically-shaped nozzle cross-section.

The elongated outer tubular shell defines at its downstream end a converging frusto-conically-shaped nozzle cross-section.

The inner wall of the nozzle opening of the slidably movable elongated tubular member may move toward and away from the outer wall of an adjacent tubular member when the slidably movable tubular member is moved in one direction or the opposite direction.

A portion of the outer wall of the slidably movable outer tubular member is contiguous with the inner wall of the outer tubular shell and makes sliding contact therewith, and the inner wall of the nozzle opening of the slidably movable outer tubular member moves toward and away from the outer wall of the intermediate tubular member when the outer tubular member is moved in one direction or the opposite direction.

In an alternate embodiment, a portion of the inner wall of the inner wall of the slidably movable outer tubular member is contiguous with the outer wall of the intermediate tubular member and makes sliding contact therewith, and the outer wall of the nozzle opening of the slidably outer tubular member moves toward and away from the inner wall of the outer tubular shell when the outer tubular member is moved in one direction or the opposite direction.

The first and second walls of the annular chamber each define therebehind an annular cooling chamber adapted to receive therein a cooling medium for minimizing heat degradation of the dynamic seal for the annular piston.

The annular piston may define in each of its radially inner and outer surfaces a groove extending therearound, each groove adapted to receive partly therein an annular sealing ring by which a seal is provided between the annular piston and the walls of the annular chamber.

The arrangement for limiting the extent of axial movement of the annular piston comprises annular rings of predetermined heights, one each for the annular chamber on each side of the annular piston.

BRIEF DESCRIPTION OF DRAWING

The details of my invention will be described in connection with the accompanying drawings, in which.

BEST MODE FOR CARRYING OUT THE INVENTION

Figure 1:
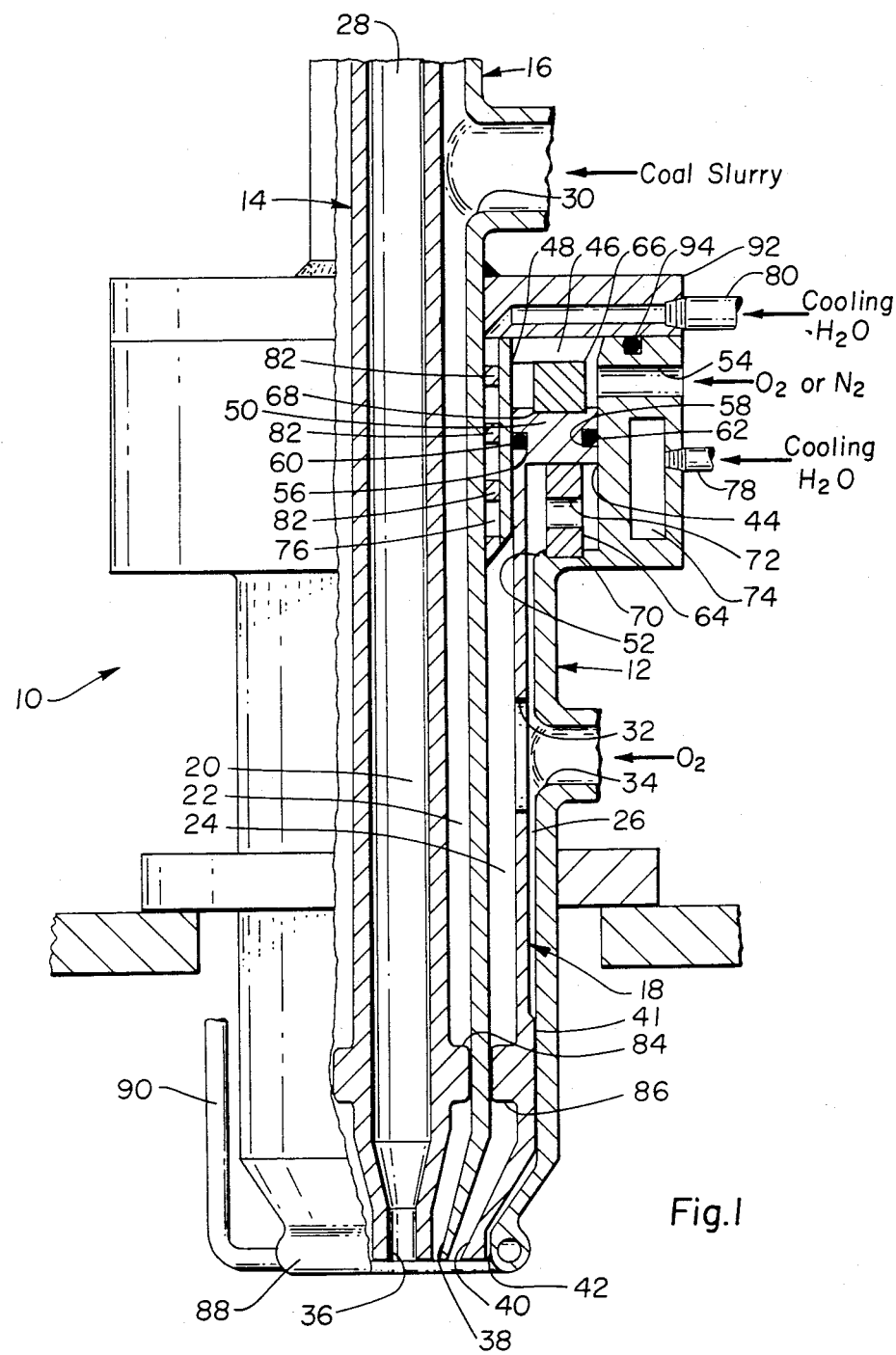
FIG. 1 is an elevational view in cross-section of the variable capacity gasification burner.

In reference to FIG. 1, 10 designates the variable capacity gasification burner of the present invention. The burner comprises an outer elongated tubular shell 12, and a plurality of elongated concentric tubular members positioned concentrically within the outer tubular shell and more specifically identified as a center tubular number 14, an intermediate tubular member 16, and an outer tubular member 18.

The plurality of elongated concentric tubular members 14, 16 and 18 are spaced from the outer tubular shell 12 and are spaced from each other to define along and therebetween and with the outer tubular shell channels 20, 22, 24 and 26 along which suitable reactants may flow. Each of the tubular members has an upstream end and a downstream end, referring, of course, to the direction of reactant flow.

The outer elongated tubular shell 12 and the elongated concentric tubular members 14, 16 and 18 define at their respective upstream ends openings 28, 30, 32, 34 through which reactants may be introduced, and at their respective downstream ends nozzle openings 36, 38, 40, 42 from which the reactants flow and come together for reaction. The center tubular member 14 defines at its downstream end a cross-section that converges from a larger diameter tubular portion to a smaller diameter tubular portion; and each of the intermediate tubular member 16, the outer tubular member 18, and the outer tubular shell 12 define at their downstream ends converging frusto-conically-shaped nozzle cross-sections.

The reactants may be, for example, oxygen ($O_2$) for introduction into opening 28 and along channel 20; a hydrocarbon such as a coal slurry for introduction into opening 30 and along channel 22; oxygen ($O_2$) for introduction into opening 32 and along channel 24; and the same oxygen ($O_2$) as in opening 32 for introduction into the opening 34 of the outer tubular shell 12 for flow along channel 26 as well as for subsequent introduction into the opening 32. This latter flow will be described later in this specification in more detail.

One of the elongated tubular members is adapted to be slidably moved in an axial direction parallel to the axis of the concentric tubular members, and the wall of its nozzle opening of the slidably movable tubular member is thus adapted to be moved toward and away from the wall of one of the outer tubular shell and tubular members to constrict and open up the nozzle opening to the channel therebetween to regulate the flow velocity of the reactant therefrom. For instance, in the preferred embodiment of this invention, the outer tubular member 18 is adapted to be slidably moved as described. The inner wall of its nozzle opening 40 is moved toward the outer wall of the adjacent intermediate tubular member 16 and thus constricts the nozzle opening 40 which is located therebetween when the outer tubular member 18 is moved in one direction. A portion of the outer wall of the slidably movable outer tubular member 18, such as an annular land 41, is contiguous with the inner wall of the outer tubular shell and makes sliding contact therewith. By using this annular land construction, it is necessary only to polish finish this portion of the outer surface of the outer tubular member 18 so that it may readily slide relative to the outer tubular shell instead of having to polish finish the entire outer surface of the outer tubular member 18. When the inner wall of the nozzle opening 40 is moved away from the outer wall of the intermedial tubular member 16 the nozzle opening 40 is thus opened up to the channel therebetween when the outer tubular member 18 is moved in the opposite direction. The movement of the outer tubular member thus serves to regulate the flow velocity of the reactant along channel 24 and from nozzle opening 40. The means for accomplishing this movement during the operation of the burner will now be described.

The outer tubular shell 12 defines at its upstream end one wall 44 of an annular chamber 46 that is concentric with the concentric tubular members and the outer tubular shell.

Another of the elongated tubular members, such as the intermediate tubular member 16, also defines at its upstream end the second wall 48 of the annular chamber 46 and being spaced opposite the one wall 44 of the annular chamber.

The slidably movable outer tubular member 18 at its upstream end also defines an annular piston 50 adapted to be slidably moved axially within the annular chamber. The annular piston slidably engages the one wall 44 and the second wall 48 of the annular chamber 46.

The outer tubular shell 12 also defines first and second conduit openings 52, 54 through which one of the reactants may be introduced to the portion of the annular chamber on one side of the annular piston 50 and one of the reactants or an inert gas, such as nitrogen, may be introduced to the portion of the annular chamber on the other side of the annular piston to move the annular piston in one direction or the other depending upon the difference in pressure between the two sides of the annular piston. This is a significant feature of this invention as will be discussed later.

The annular piston 50 defines in each of its radially inner and outer surfaces a groove, 56, 58, respectively. Each groove is adapted to receive partly therein an annular sealing ring 60, 62 by which a seal is provided between the annular piston and the walls of the annular chamber. By "partly therein" it is meant that each annular sealing ring is of such size with respect to the groove as to fill the groove and also to radially extend partly beyond the groove so as to engage the walls of the annular chamber and achieve an effective seal therewith. This seal between the movable annular piston and the walls of the annular chamber thus constitutes a "dynamic seal" that prevents the flow of reactant from the portion of the annular chamber on one side of the annular piston to the portion of the annular chamber on the other side of the annular piston.

It is important to note that should this dynamic seal fail for whatever reason, the leakage of the reactant past this seal will either safely flow back through the second conduit opening 54, or along channels 26 and 24 and back through opening 32 and/or out through nozzle openings 38 and 40. This means, therefore, that there would be no blow-out of a reactant such as oxygen to the atmosphere. The direction of flow in the event of a leakage would depend upon the difference in pressure in the annular chamber between the two sides of the annular piston, with the flow tending to go from the high pressure side to the low pressure side.

The annular piston 50 also has an arrangement for limiting the extent of axial movement of the annular piston in either direction. Such "arrangement" may comprise annular spacing rings 64, 66 of predetermined heights. Annular spacing ring 66 may be seated in an annular groove 68 in the one end face of the annular piston and the other annular ring spacing 64 may be seated in an annular groove 70 formed in the downstream end walls of the annular chamber. The height of each annular spacing ring determines how far the annular piston may be moved in a particular direction before one of the annular spacing rings interferes with further movement of the annular piston. Annular spacing ring 64 is provided with a plurality of holes 72 to allow ready flow of reactant past the annular spacing rings through that part of the annular chamber 46 on the one side of the annular piston.

The first or one wall 44 and the second wall 48 of the annular chamber 46 each defines therebehind an annular cooling chamber 74, 76 respectively, into which cooling water may flow by way of conduits 78, 80 respectively, for the purpose of cooling the walls of the annular chamber 46 so as to minimize heat degradation of the dynamic seals 60, 62 and thereby extend their life. Other conduits (not shown) are provided to convey the heated water from the annular cooling chambers. Annular cooling chamber 76 is provided with baffles 82 to establish a definite flow pattern of the cooling water. The baffles are in the form of annular rings that are gapped (not shown) at 180° intervals so as to allow complete circulation through annular cooling chamber 76.

Centering ribs 84, 86 are provided near the downstream ends of the center tubular member 14 and the outer tubular member 18 to assist in spacing the center, intermediate and outer tubular members from each other. There are four ribs spaced therearound each of the tubular members.

The outer tubular shell 12 is provided at its downstream end on the outer surface with an annular cooling chamber 88 to prevent pre-ignition of reactant flowing therefrom and burnout of the downstream end of the outer tubular shell and thus enhance the operating efficiency and life of the burner. Cooling water is introduced into the annular cooling chamber 90 through conduit 90 and removed through another conduit not shown.

The upstream end of the outer tubular shell 12 is secured against the outer atmosphere by means of the annular flange 92 bolted (bolts not shown) to the main body of the outer tubular shell and provided with a suitable seal therebetween such as shown at 94. The annular flange is welded to the intermediate tubular member as shown. This arrangement forms the static seal referred to previously since the assembled parts are not intended to move relatively to each other once they are bolted together.

Operation

In operation of the variable capacity gasification burner 10, at either a 50% or 100% capacity rate, the difference in pressure on one side of the annular piston 50 with respect to the other side of the annular piston may be controlled by using a commercially available differential pressure controller (not shown). For instance, suppose the gasifier vessel (not shown) in which the gasification burner of this invention is mounted is pressurized at 6895 kilopascals (1000 psi), then the portion of the annular chamber shown in FIG. 1 above the annular piston 50 can be pressurized at 7584.5 kilopascals (1100 psi) when the annular piston is to be at the lowermost adjusted position, i.e. at 100% capacity; or the portion of the annular chamber shown in FIG. 1 above the annular piston can be pressurized at 6205.5 kilopascals (900 psi) while the gasifier is pressurized at 6895 kilopascals (1000 psi) when the annular piston is to be at the uppermost adjusted position, i.e. at 50% capacity. In either case, the dynamic seals are sealing at a differential pressure of only 689.5 kilopascals (100 psi) instead of the total pressure involved.

What is most significant about the structural arrangement disclosed herein is that there is less chance of leakage past the dynamic seals because of the ability of this arrangement to control the differential pressure across the annular piston and that there is so little of the pressure involved that actually works against the dynamic seals.

Even if a leakage should occur past the dynamic seals into the upper portion of the annular chamber shown in FIG. 1 above the annular piston, the leakage would only flow through the conduit 54. If the leakage were oxygen it could return to the oxygen compressor inlet (not shown) and be reused, assuming, of course, that what is initially being supplied through conduit 54 is oxygen. Should there be a leakage past the dynamic seals to the lower portion of the annular chamber 60 shown in FIG. 1 below the annular piston, the leakage would pass on through the nozzle with the normal flow of oxygen and be consumed within the gasifier (not shown). An instrument may be provided to indicate when there is such a leakage flow. A minor leakage may be tolerated until such time the gasifier can be shut down so the seals can be replaced on a regularly-scheduled shutdown.

Alternate Embodiment

Figure 2:
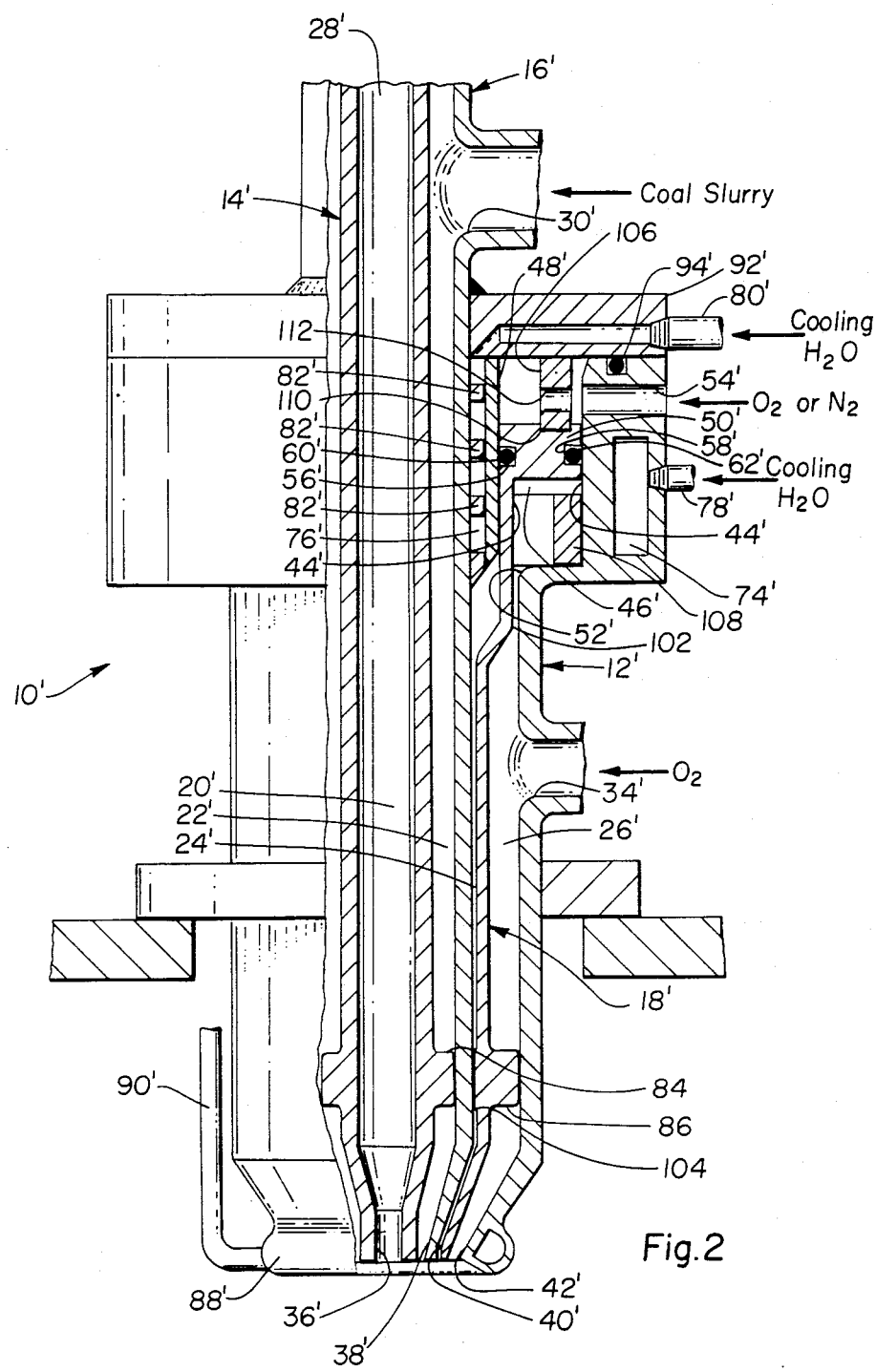
FIG. 2 is an elevational view in cross-section of an alternate embodiment of the variable capacity gasification burner.

In reference to FIG. 2, an alternate embodiment of the gasification burner is disclosed. Since most of the parts of the burner are the same as disclosed in FIG. 1, each of the like parts will not be described again but will be identified by the same reference number with a prime mark beside it, while the parts that are different will be described and identified by new reference numbers.

In FIG. 2, therefore, the variable capacity gasification burner 10' has an outer tubular member 18', which is positioned so that a portion of its inner wall is contiguous with the outer wall of the intermediate tubular member 16' and makes sliding contact therewith when the outer tubular member 18' is moved in one direction or the opposite direction. The outer tubular member is provided near its upstream end with an offset 102 so as to clear the annular cooling chamber 76' when the outer tubular member is so slidably moved.

A portion of the inner wall of the slidably movable outer tubular member 18', such as annular land 104, is contiguous with the outer wall of the intermediate tubular member 16' and makes sliding contact therewith.

The annular piston 50' in FIG. 2 also has an arrangement for limiting the extent of axial movement of the annular piston in either direction. This "arrangement" comprises annular spacing rings 106, 108 of predetermined heights. Annular spacing ring 106 may be seated in an annular groove 110 formed in the one end face of the annular piston 50', and the other annular spacing ring 108 is of such diameter as to extend to the outermost radial portion of the annular chamber 46'. Annular spacing ring 106 is provided with a plurality of holes 112 to allow ready flow of reactant past the annular spacing ring through that part of the annular chamber 46' on the one side of the annular piston.

With respect to the embodiment shown in FIG. 2 it will be noted that when the outer tubular member 18' is moved downwardly from the position shown in FIG. 2 to constrict the channel 26' between it and outer tubular shell 12', its downstream end will extend beyond the plane of the other nozzle downstream ends. This may result in slag forming on such exposed downstream end, thus making it difficult to readjust to the other position.

Hence the embodiment shown in FIG. 1 is more preferred embodiment because when the downstream end of the outer tubular member 18 is moved, it never extends beyond the plane of the nozzle downstream ends. Also its trapezoidal-like end configuration as shown in FIG. 1 tends to scrape away any slag that might possibly form on the downstream end on the inside surface of the outer tubular shell 12.

The invention has been described in detail with particular reference to preferred embodiments thereof, but it will be understood that variations and modifications can be effected within the spirit and scope of the invention.

I claim:

1. A variable capacity gasification burner comprising an outer elongated tubular shell having upstream and downstream ends and being statically sealed against the atmosphere outside the shell when the downstream end is positioned in the intended operating environment, and a plurality of elongated concentric tubular members positioned concentrically within said outer tubular shell and being spaced therefrom and from each other to define along and therebetween and with said outer elongated tubular shell channels along which reactants may flow, said tubular members also having upstream and downstream ends;

said outer elongated tubular shell and said elongated concentric tubular members defining at their respective upstream ends openings through which said reactants may be introduced, and at their respective downstream ends nozzle openings from which said reactants flow and come together for reaction;

one of said elongated tubular members being adapted when the burner is in said intended operating environment to be slidably moved in an axial direction parallel to the axis of the concentric tubular members and the wall of its nozzle opening thus being adapted to be moved toward and away from the wall of one of the outer tubular shell and tubular members to constrict and open up the nozzle opening to the channel therebetween to regulate the flow velocity of reactant therefrom;

said outer tubular shell defining at its upstream end one wall of an annular chamber concentric with said concentric tubular members and said outer tubular shell;

another of said elongated tubular members also defining at its upstream end the second wall of said annular chamber spaced opposite said one wall of the annular chamber;

said slidably movable elongated tubular member at its upstream end also defining an annular piston adapted to be slidably moved axially within said annular chamber;

said outer tubular shell also defining first and second conduit openings through which one of said reactants may be introduced to the portion of the annular chamber on said one side of said annular piston and one of said reactants or an inert gas may be introduced to the portion of the annular chamber on the other side of the annular piston to move the annular piston in one direction or the other depending upon the difference in pressure between the two sides of the annular piston;

said annular piston having means for limiting the extent of axial movement of the annular piston in either direction and having means for providing a dynamic seal between the annular piston and the walls of the annular chamber to prevent flow of said one reactant from the portion of the annular chamber on one side of the annular piston to the portion of the annular chamber on the other side of the annular piston.

2. A variable capacity gasification burner as defined in claim 1 wherein said plurality of elongated concentric tubular members comprises:

a fixed center tubular member adapted to receive through its upstream end opening one of the reactants, oxygen, and defining at its downstream end a cross-section that converges from a larger diameter tubular portion to a smaller diameter tubular portion;

a fixed intermediate tubular member surrounding said center tubular member and adapted to receive through its upstream end opening another of the reactants, coal slurry, and defining at its downstream end a converging frusto-conically shaped nozzle cross-section;

a slidably movable outer tubular member surrounding said intermediate tubular member and adapted to receive through its upstream end one of the reactants, oxygen, and defining at its downstream end a frustro-conically shaped nozzle cross-section; and wherein said elongated outer tubular shell defines at its downstream end a converging frustoconically shaped nozzle cross-section.

3. A variable capacity gasification burner as defined in claim 1 wherein the inner wall of the nozzle opening of said slidably movable elongated tubular member moves toward and away from the outer wall of an adjacent tubular member when said slidably movable tubular member is moved in one direction or the opposite direction.

4. A variable capacity gasification burner as defined in claim 2 wherein a portion of the outer wall of said slidably movable outer tubular member is contiguous with the inner wall of said outer tubular shell and makes sliding contact therewith, and the inner wall of the nozzle opening of said slidably movable outer tubular member moves toward and away from the outer wall of the intermediate tubular member when the outer tubular member is moved in one direction or the opposite direction.

5. A variable capacity gasification burner as defined in claim 2 wherein a portion of the inner wall of said slidably movable outer tubular member is contiguous with the outer wall of said intermediate tubular member and makes sliding contact therewith, and the outer wall of the nozzle opening of said slidably movable outer tubular member moves toward and away from the inner wall of the outer tubular shell when the outer tubular member is moved in one direction or the opposite direction.

6. A variable capacity gasification burner as defined in claim 1 wherein said first and second walls of said annular chamber each defines therebehind an annular cooling chamber adapted to receive therein a cooling medium for minimizing heat degradation of the dynamic seal for said annular piston.

7. A variable capacity gasification burner as defined in claim 1 wherein said annular piston defines in each of its radially inner and outer surfaces a groove extending therearound, each said groove adapted to receive partly therein an annular sealing ring by which a seal is provided between said annular piston and the walls of the annular chamber.

8. A variable capacity gasification burner as defined in claim 1 wherein said means for limiting the extent of axial movement of said annular piston comprises annular spacing rings of predetermined heights, one each for the annular chamber on each side of the annular piston.

* * * * *